Oct. 19, 1965  S. E. CARLTON  3,212,520
SWING TYPE CHECK VALVE WITH INTERNAL RELIEF VALVE
Filed July 25, 1963  2 Sheets-Sheet 1
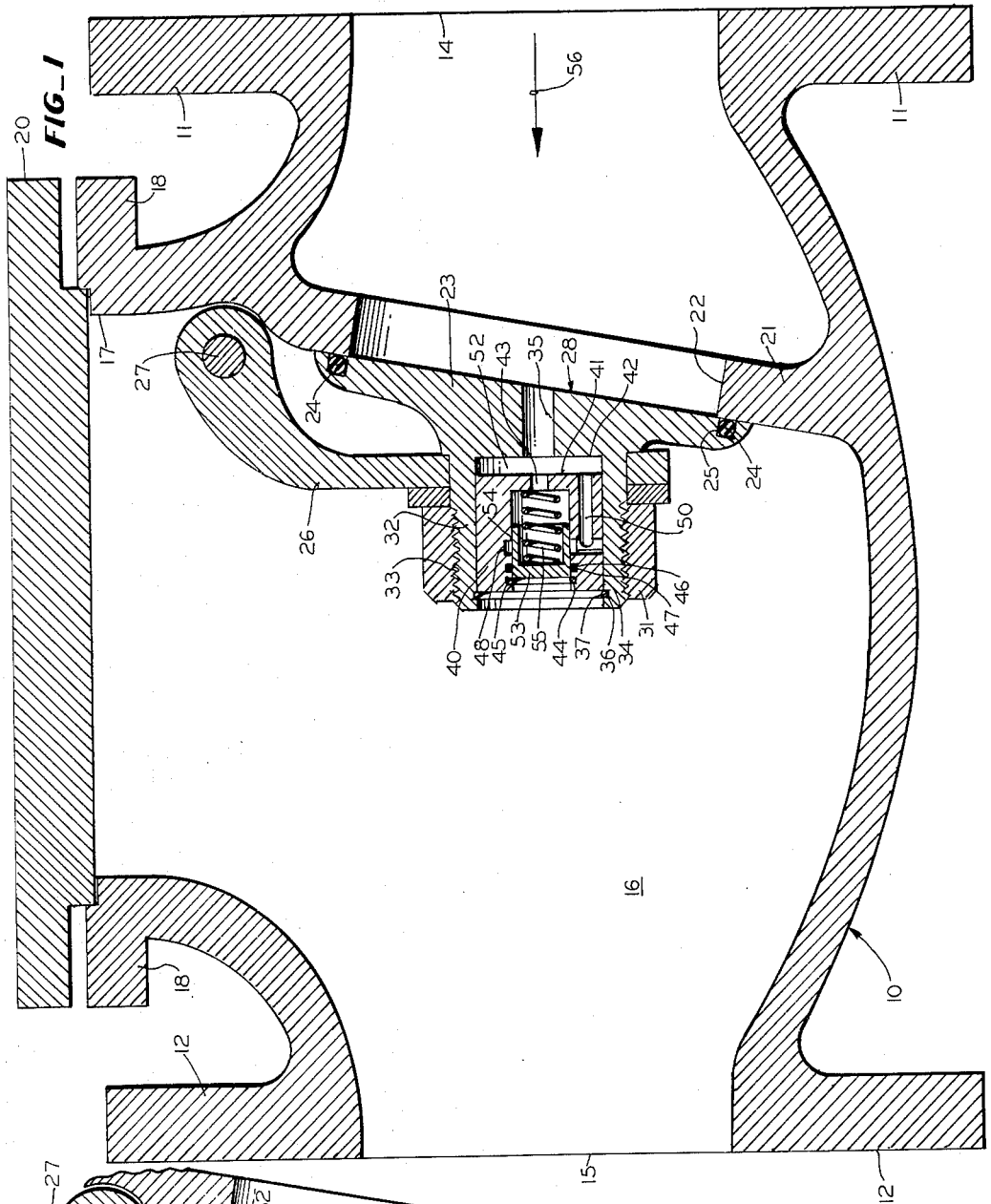
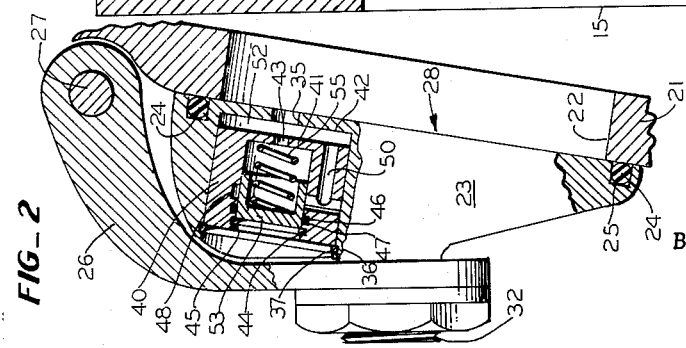
INVENTOR.
SYDNEY E. CARLTON
BY
ATTORNEY Oct. 19, 1965 S. E. CARLTON 3,212,520
SWING TYPE CHECK VALVE WITH INTERNAL RELIEF VALVE
Filed July 25, 1963 2 Sheets-Sheet 2
FIG_3
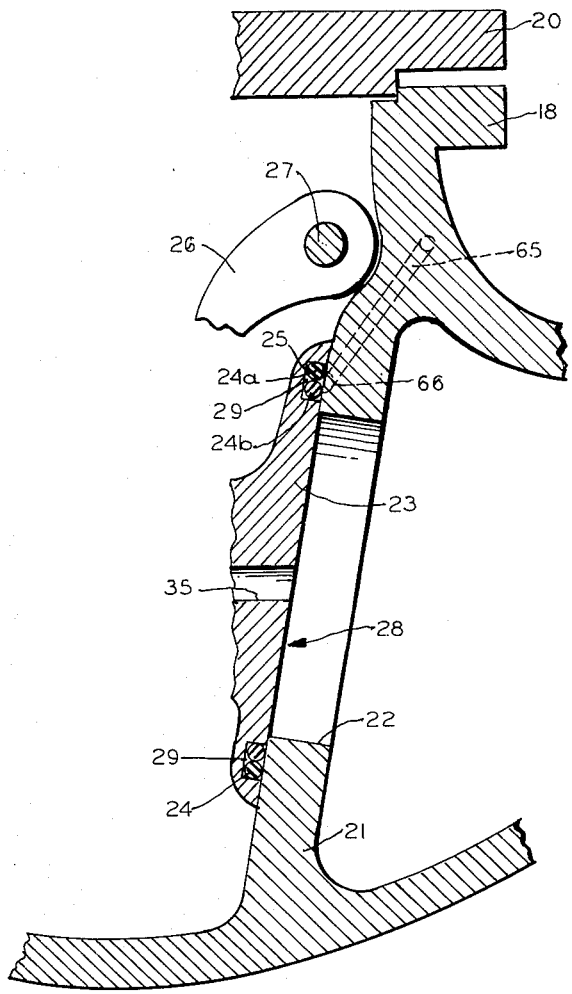
FIG_4
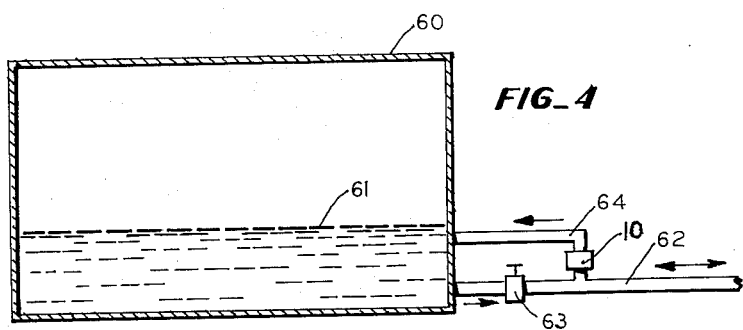
INVENTOR.
SYDNEY E. CARLTON
BY
ATTORNEY

United States Patent Office 3,212,520
Patented Oct. 19, 1965

3,212,520
SWING TYPE CHECK VALVE WITH INTERNAL RELIEF VALVE
Sydney E. Carlton, 240 W. Hereford, Gladstone, Oreg.
Filed July 25, 1963, Ser. No. 297,506
6 Claims. (Cl. 137—493.1)

The present invention relates to check valves with special emphasis upon swing type check valves for pipeline transportation, for both liquids and gases. More particularly it relates to an internal relief valve which becomes operative in response to internal conditions within the line and the valve body on the downstream side, when the check valve is in the closed position.

Under existing conditions, if a fire develops in the line, the check valves will close in response to the failure of flow pressure in the line or the build up of back pressure. A fire in the line on the downstream side of the closed check valve will build up internal pressures within the line quickly. Fire is only one example and there are many other situations which build up pressures in the line when the check valves are closed. At the present time there is no way to relieve this pressure internally, which means that the pipeline where the pressures exist in excessive amounts, will blow up both the line and the valve. Thus, there is a great potential danger resulting from the unrelieved pressures as well as the expense of repairing and replacing the damage in the event of a rupture.

It is among the objects of the present invention to provide an internal pressure relief valve in combination with the clapper of a check valve, which will relieve excessive internal pressures when the check valve is in the closed position, before damage or further damage can occur.

It is another object of the present invention to provide an internal relief valve which will operate under predictable conditions and will automatically close when the conditions have been met.

It is still another object of the present invention to provide an internal relief valve which may be incorporated as a part of existing clappers without replacement or change in an existing check valve.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

In the drawings:

FIGURE 1 shows a standard check valve with an internal relief valve set in the boss provided on the clapper;

FIGURE 2 shows the relief valve positioned in a standard clapper and offset from the through axis of the valve body;

FIGURE 3 is a fragmentary vertical section showing the check valve face, the seating web and a portion of the valve body in the vicinity of the check valve face; and FIGURE 4 is a diagrammatic view showing the advantageous use of a check valve of the present invention.

Referring now more particularly to the drawings, both FIGURES 1 and 2 show a standard check valve having a body 10 with flanged coupling portions 11 and 12 at the respective ends for coupling in the line. The entrance end 14 and the outlet end 15 are substantially the same internal diameter as the pipeline, but between the two there is an enlarged body cavity 16. At the top of the valve, as shown in the drawings, or at a side thereof, there is an opening 17 which has a coupling flange 18. This receives and retains a bonnet 20 which is normally secured to the coupling flange 18 by bolts, but can be held in any suitable manner. It is to be observed that by removing the bonnet 20 easy access to the inner chamber 16 of the valve body is provided.

Adjacent the entry end 14 of the valve there is a transverse partition 21 having an opening 22 which is substantially equal in diameter to the diameters of the entrance end 14 and the discharge end 15. This opening is covered by a clapper 23 which is larger in diameter than the opening 22. The clapper 23 more than spans the opening 22 and is provided with an O-ring 24 which is set in the face of the clapper by a specially constructed groove 25. The clapper is positioned by means of a swinging fork or arm 26 which is mounted for rotation on a pin 27 which passes transversely through the valve body 10 and is journaled at either side of the valve body in suitable bosses (not shown). It will thus be observed that pressure in the line from the entry end 14 will bear against the face 28 of the clapper 23 causing it to swing open and rotate on pin 27, to the degree required by pressure in the line through the entrance 14. When the pressure through the entrance 14 is not enough to open the check valve, then the clapper 23 positively swings to the closed position and is maintained in that position. The swinging fork or arm 26 is positioned on the clapper by means of a washer 30 and a screw-down nut 31.

What has been described up to this point is conventional and is the usual function of a check valve.

The clapper 23 as shown in FIGURE 1, is provided with an axially aligned and integral boss 32 which is threaded as at 33, to hold the screw-down nut 31. On the downstream side there is an axial counter-bore 34 for a considerable portion of its length which communicates directly with a smaller axial through bore 35 which passes through the face 28 of the clapper 23. Adjacent the downstream terminus of the through bore 35 is an annular radial groove 36 for retaining snap ring 37 which holds the valve body 40 of the internal relief valve in position in the counter-bore 34. The valve body 40 is cylindrical in shape with the head end 41 facing the bottom 42 of the counter-bore 34. There is an axial bore 43 through the head 41 of the relief valve body in axial alignment with the passage 35 through the clapper. The cylinder 40 is bored axially so that the interior thereof is hollow. The valve body 40 has three radially and outwardly extending annular grooves on the interior surface thereof, the first being a small groove 44 for snap ring 45 which retains the valve piston 53 in position in the bore 34. The next is a slightly larger groove inward of the first mentioned one and is numbered 46. This is for the O-ring 47 protecting the smooth sliding operation of the body 40. The third is a still larger groove 48 which is connected by a longitudinally offset passage 50 through the head 41, and by this means communicates with the space 52 between the valve head 41 and the bottom of the counter-bore 42.

Piston 53 is cylindrical in shape and is mounted for sliding movement with the counter-bore 34. The piston 53 is hollow because of the counter-bore 54 leaving a solid head on the downstream side. Mounted within the counter-bore 54 is a compression spring 55 which bears against the inner surface of the piston head at one end and the bottom of the counter-bore 34 of the valve body at the other end.

The operation of the device is as follows: The flow in the pipeline is always in the direction of the arrow 56, which flow is sufficient normally to swing the clapper 23 on the pin 27 to the open position. When the pressure of the flow is not sufficient to open the clapper it closes by itself and seals by means of the O-ring 24. It is apparent that one or more O-rings may be employed for this purpose. The pressure relief valve operates only when the clapper is in the closed, sealed position. If for any reason the pressure on the downstream side is greater than the pressure on the upstream side, or if the pressure of flow is not sufficient to swing the clapper off its seat, the clapper will seal and such a situation may result in a build up of pressure on the downstream side of the closed clapper. When the pressure on the downstream side against the piston 53 builds up to the point where it overcomes the holding capacity of the compression spring 55, then the piston 53 will be moved to the right a sufficient distance to allow the pressure to communicate with the annular passage 48 which in turn connects with the passage 50 through the space 52 and out through passage 35 to the upstream side where a fortiori, the pressure is less. Thus, the excessive pressure on the downstream side is relieved to the lesser pressure on the upstream side. The piston 53 will remain at the righthand movable position uncovering the relief passage 48 until a point where the piston 53 and its compression spring 55 have reduced the pressure on the downstream side to a point where the spring 55 will cause the piston 53 to move to the left to the closed position sealing off the passage 48.

It is apparent that much of the control of the internal relief valve and its operating characteristics are determined by the limits of and the selection of an appropriate spring 55. Springs can be obtained whereat a pressure of X pounds will be required to open the communicating passages for relief and for closing the valve when the pressures have been reduced to Y amount.

While the description has proceeded on the theory that the swing check valve would be operated in a liquid line, it should also be stated that this is equally operable and effective in a gas line.

Referring now to FIGURE 2, there is shown a conventional clapper and check valve which does not have any special boss 32. The check valve unit which is defined by the body 40 may be installed by merely drilling a through bore through the clapper at any convenient place. It does not have to be axial but can be placed at an angle or in any position through the clapper. This form, as shown by FIGURE 2, does not require a specially made clapper 23, and may be positioned anywhere in the existing clapper and still function perfectly in the same manner as described above.

In FIGURE 3 the fragmentary view shows only a section of the check valve face 28 and a portion of the web 21 with the opening 22. Instead of the single O-ring 24 there are two O-rings 24a and 24b which are concentric and placed within the same groove. The groove 25 is a specially constructed groove having an island 29 between the two O-rings with an undercut shape on both annular surfaces of the island. The island 29 also serves to provide a fixed space between the two O-rings. In the upper portion of the web 21 of the valve body, there is a passage 65 drilled angularly and downwardly from the outer surface of the valve body so that it leads directly to the space between the two O-rings 24a and 24b. Any excess pressure which might move from the pressure side and become entrapped between the two O-rings is relieved to atmosphere through the opening 66 and through the passage 65. In this manner any pressure which would tend to unseat or make the seating insecure is relieved so that there is a tight seal when the check valve is closed.

Referring now to FIGURE 4, there is shown a hook-up which provides a particularly advantageous use for the check valve of the present invention. A tank 60 has a changeable liquid level 61. In the usual tank installation two pipelines are required, one to fill the tank and the other a suction or gravity line for withdrawing the liquid contents. In the installation shown in FIGURE 4 there is only one main line 62 which leads to and from the bottom of the tank and a short by-pass line 64. The gate valve 63 is ahead of the by-pass line juncture on the downstream side of the line 62 and is in the open position only when the contents of the tank 60 are to be withdrawn. When the tank is filled or its contents are to be added to, the same line 62 is used, only the entering liquid is by-passed through the by-pass line 64 which contains the check valve 10. The fluids being delivered to the tank pass through the check valve 10 and open the flap 28 permitting the supply to pass on into the tank uninterruptedly. When the in flow in line 62 ceases, the check valve 10 will close and will be held in the closed position by the back pressure and the lack of pressure in the line 62. In this way one of the two lines leading to the tank is eliminated. In the system shown in FIGURE 4, a check valve 10 of the type shown in FIGURE 3 would be used in which case the passage 65 will become a bleed line to give a positive indication as to whether or not the check valve was functioning and holding the seal. The installation of the check valve 10 in the by-pass line 64 above the line 62 of the gate valve is important as providing an easy and readily available method of repairing and servicing the check valve. By installing the check valve in a line above the port to the gate valve enables the check valve to be repaired or otherwise serviced by lowering the level of the contents of the tank 60 to a point below the by-pass port 64. It is important to do this because check valves usually require more frequent repair and servicing than gate valves. The tank 60 need not be completely emptied to accomplish this feature.

I claim:

1. In combination a swing type clapper for closing and sealing the opening through a conventional valve when the line pressure is less than that required to swing said clapper to the open position, a relief valve mounted in said clapper on the downstream side for operation when said clapper is in the closed position, said relief valve comprising a main body portion having a top and bottom with an axial counter-bore from the top for a substantial portion of its axial length and an axial passage of lesser diameter connecting the bottom of said axial counter-bore to the exterior bottom, an internal annular groove in said counter-bore providing a passage therearound, an axially offset longitudinal passage connecting said annular passage to the exterior bottom of said body, a hollow piston mounted for slidable movement in said counter-bore, movable toward the bottom to uncover the said annular passage, a spring retained within said counter-bore and said hollow piston biased to maintain the piston in the closed or covered position with respect to said annular groove, a chamber beneath the bottom of said valve body in the clapper mounting, and a passage through the clapper connecting the face thereof and said chamber.

2. The swing type clapper of claim 1 wherein the clapper has a boss for mounting the relief valve which is substantially in axial alignment with the opening through the valve.

3. The swing type clapper of claim 1 wherein the clapper has a pair of spaced concentric O-rings on the upstream face for sealing in the closed position.

4. In combination an internal swing type clapper for closing and sealing an opening through a conventional valve having a valve cavity, said clapper having a boss on its downstream face, a relief valve mounted in said boss and operable to relieve excess pressures in the valve cavity only when said clapper is in the closed position, said relief valve comprising a main body portion having a top and bottom with an axial counter-bore from the top for a substantial portion of its axial length and an axial passage of lesser diameter connecting the bottom of said axial counter-bore to the exterior bottom, an internal annular groove in said counter-bore providing a passage therearound, an axially offset longitudinal passage connecting said annular passage to the exterior bottom of said body, a hollow piston mounted for slidable movement in said counter-bore, movable toward the bottom to uncover the said annular passage, a spring retained within said counter-bore and said hollow piston biased to maintain the piston in the closed or covered position with respect to said annular groove, a chamber beneath the bottom of said valve body in the clapper mounting, a passage through the clapper connecting the face thereof and said chamber, a pair of spaced concentric O-rings in the face of said clapper for sealing in the closed position, and a small bleed passage in the valve body connecting the space between the O-rings with the exterior of the valve body.

5. The internal swing type clapper of claim 4 wherein the last mentioned bleed passage in the valve body is angled upwardly at a position of about 1 o'clock.

6. A single line flow system for a tank comprising in combination, a tank, a two-way single line connected to the tank adjacent the bottom thereof, a by-pass line connecting said single line adjacent said tank and said tank above the level of the single line connection, a conventional check valve having a swing type clapper for closing and sealing the opening through said valve, a relief valve mounted on said clapper and operable only when said clapper is in the closed position, said relief valve comprising a main body portion having a top and a bottom with an axial counter-bore having a top and a bottom with an axial counter-bore from the top for a substantial portion of its axial length and an axial passage of lesser diameter connecting the bottom of said axial counter-bore to the exterior bottom, an internal annular groove in said counter-bore providing a passage therearound, an axially offset longitudinal passage connecting said annular passage to the exterior bottom of said body, a hollow piston mounted for slidable movement in said counter-bore movable toward the bottom to uncover said annular passage, a spring retained within said counter-bore and said hollow piston biased to maintain the piston in the closed or covered position with respect to the annular groove, a chamber beneath the bottom of said valve body in the clapper mounting, a passage through the clapper connecting the upstream face thereof and said chamber, spaced concentric O-rings in the upstream face of said clapper for sealing in the closed position and a small passage in the valve body connecting the space between the O-rings with the exterior of the valve body, said valve being interposed in the by-pass line to permit the flow into the tank only, and a gate valve interposed in the single line between the by-pass juncture and the tank.

References Cited by the Examiner
UNITED STATES PATENTS

| | | | |
|---|---|---|---|
| 1,339,128 | 5/20 | Nye | 137—527.8 XR |
| 1,402,527 | 1/22 | Needham | 137—527.8 XR |
| 1,913,027 | 6/33 | Griffith | 137—493.1 XR |
| 2,578,590 | 12/51 | Perrault | 137—527.8 XR |
| 3,103,950 | 9/63 | Gulick | 137—538 XR |

M. CARY NELSON, *Primary Examiner.*

MARTIN P. SCHWADRON, *Examiner.*